Oct. 6, 1931.  C. G. HALL  1,825,950
WAITERLESS RESTAURANT
Filed Aug. 17, 1928  3 Sheets-Sheet 2

Fig. 2

Inventor
Charles G. Hall

Oct. 6, 1931.
C. G. HALL
1,825,950
WAITERLESS RESTAURANT
Filed Aug. 17, 1928       3 Sheets-Sheet 3
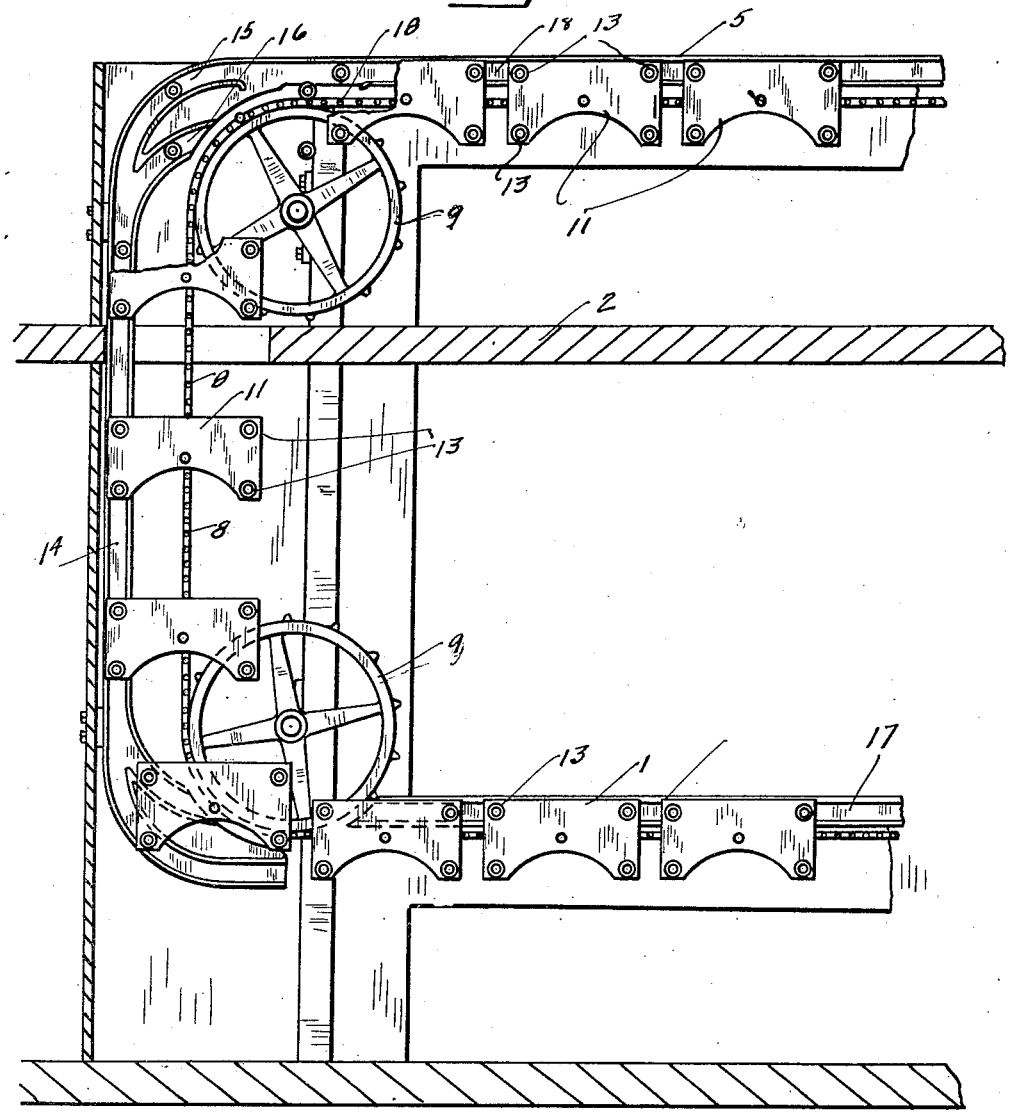
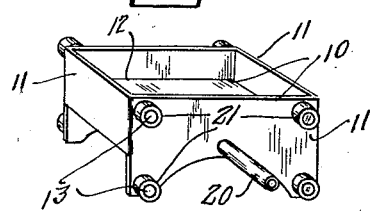
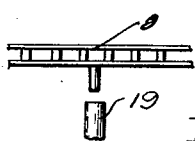
Inventor
Charles G. Hall
By Thomas Kelyper
Attorney Patented Oct. 6, 1931

1,825,950

UNITED STATES PATENT OFFICE

CHARLES G. HALL, OF BOISE, IDAHO, ASSIGNOR TO AUTOMATIC FOOD MACHINERY CORPORATION, OF BOISE, IDAHO

WAITERLESS RESTAURANT

Application filed August 17, 1928. Serial No. 300,251.

My present invention relates to my United States patent application, Serial Number 213,714 filed August 17, 1927, upon a waiterless restaurant.

The primary purpose of my new and improved device is to carry prepared food past eating tables upon one or more floors. The food to be carried upon an endless conveyor past tables and to be removed from the endless conveyor by the patrons of the place.

A further object of my device consists in providing simple and efficient means whereby the food may be prepared at a central location and be automatically carried from the point of preparation past customers seated adjacent the path of travel of the conveyors upon which the food is being conveyed; thereby permitting the patrons to personally remove the food desired from the conveyor as the same passes the patrons.

In congested centers of population during the rush periods, the success of the establishment depends upon its ability to feed a maximum number of people within a given time.

In my new and improved device the food is prepared upon one of the floors of the building and is carried therefrom to the feeding location so that the patron is seated immediately he arrives within the eating place. The food to be sold and vended is carried past the seated patron upon endless conveyors. The continuous operation thereby reducing the time of serving the patron to an absolute minimum. I accomplish these results by simple mechanism consisting primarily of an endless conveyor chain or belt made of a plurality of table units arranged in spaced relationship upon a flexible belt, the belt operating in suitable guideways for maintaining the table during its entire travel in a substantially horizontal position.

A further object of my invention resides in a mechanism that may be adapted for serving a plurality of floors of the building from one central supply station.

A further object of my invention resides in a simplified construction, one that may be used over relatively long periods with a minimum of first cost and requiring practically no upkeep maintenance after being first installed.

A further object of my invention resides in a construction that may be maintained in a highly sanitary condition.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 2 is a fragmentary, vertical, sectional view, taken on line 2—2 of Fig. 1, looking in the direction indicated.

Fig. 3 is a fragmentary, sectional, side elevation, taken on line 3—3 of Fig. 2, looking in the direction indicated.

Fig. 4 is a perspective, side view, of one of the table segments disposed upon the endless chain.

Fig. 5 is fragmentary top plan view, of the conveyor chain illustrating the adaption of the table journal to that of the bearing disposed upon the chain.

Like reference characters refer to like parts throughout the several views.

Figure 1:
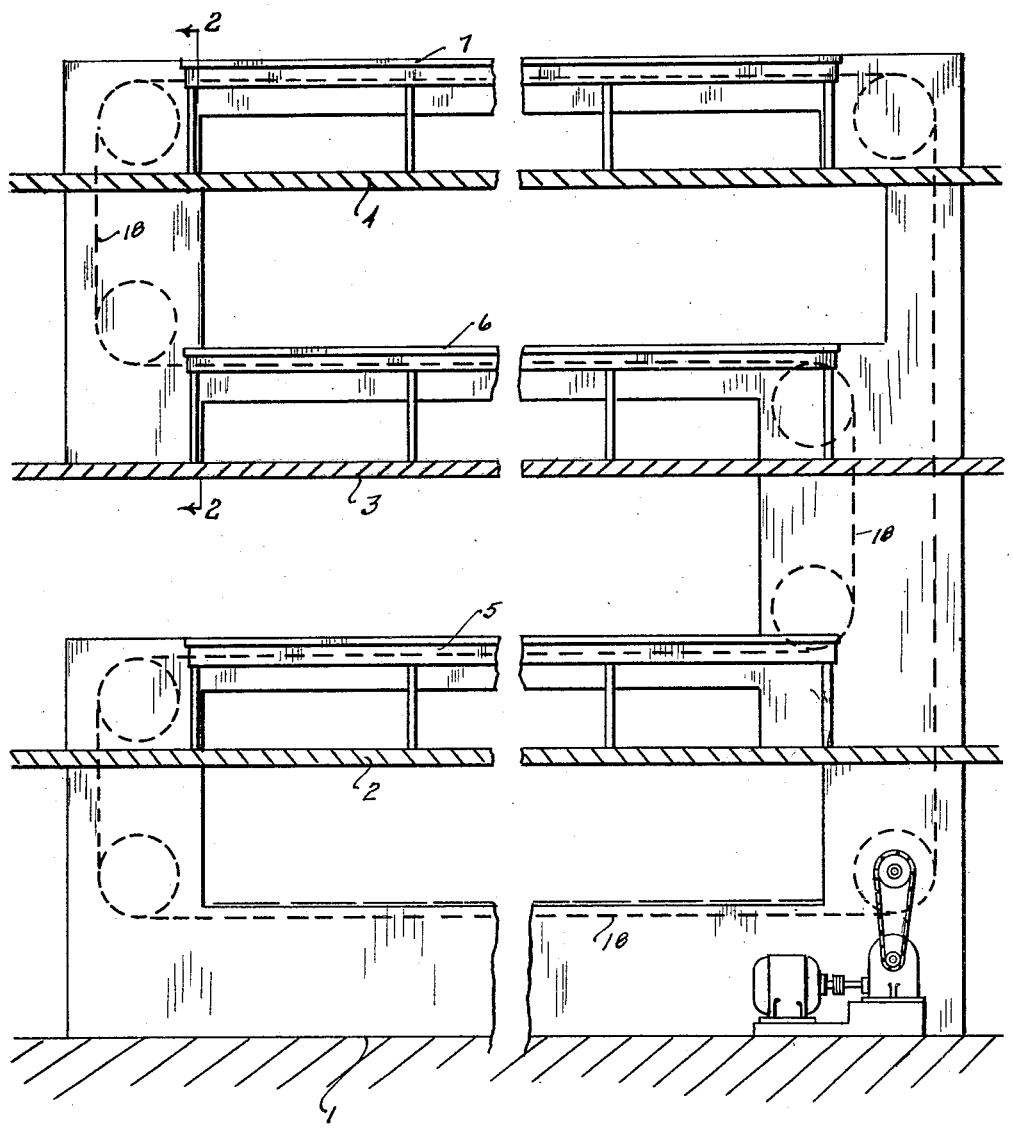
Fig. 1 is a diagrammatical lay-out of my new and improved construction showing the same serving four floors of a building the same being in cross section as to the building and illustrating the path of travel of the serving belt by dotted lines.

In my present construction, the same is adapted to serve a plurality of floors, 1, 2, 3, and 4 with tables 5, 6 and 7 arranged upon each floor and disposed at either side of the transfer channel through which the endless chains carrying the carriages 10 pass. Endless chains or belts 8, are trained about a plurality of sprockets 9, said sprockets being disposed in registerable alignment with each other upon adjacent floors so that the chain carrying the serving carriages may move from floor to floor. Each chain has a plurality of journal bearings 19 disposed outwardly therefrom said journal bearings being in spaced relation and in registerable alignment with like journal bearings disposed upon the other chain. Removably mounted upon the chains are a plurality of serving carriages 10. The carriages are composed of side and end walls 11, and have a depressed bottom 12, into which the food to be displayed is placed. Outwardly extending journal bearings 13 are disposed at either of the side walls of the carriages, preferably four in number, disposed at each side, comprising two pairs with one bearing being disposed above the other, as illustrated in detail in Fig. 4, said bearings having carriage rollers 21 disposed thereon. Journals 20 are centrally disposed on each side of the carriages equidistant from the roller carrying journal bearings and adapted to ride about the journal bearings 19 disposed upon the chains so that the carriages are at all times well balanced and adapted to being easily maneuvered from one direction to another. An end guideway 14 is disposed substantially vertical into which the journal bearing rollers 21 are made to pass, the purpose of which is to maintain the serving carriage disposed upon the chains in a horizontal position when traveling from floor to floor. At the top and bottom ends of the guideways, a bifurcated channel, as illustrated at 15 and 16 in Fig. 3, is formed into which the side journal bearing rollers of the carriages are made to pass. The bifurcated channels are inclined at such an angle as to positively maintain the carriages in horizontal position when the change of direction is being made from horizontal to vertical travel. Guideways 17 and 18 are disposed in a horizontal position below the tables immediately next to the transfer channel disposed between the tables through which the carriages are made to pass as they are moved in the same plane. Patrons or attendants may place the soiled utensils upon the carriages disposed upon the chains, thereby eliminating the service of bus boys since the dishes and other utensils and foods will be transferred to a central service station.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In conveying apparatus, pairs of sprockets disposed in different horizontal planes and in spaced relation with each other, pairs of horizontal and pairs of vertical guideways disposed in direct alignment with the pairs of sprockets, a pair of endless sprocket chains trained about said sprockets, carriages removably journaled to said chains and guided through their travels by the guideways and the chains, said carriages having two pairs of rollers extending outwardly from each of their side walls, the upper pairs of rollers adapted to ride upon the horizontal guideways when the carriages are traveling in a horizontal plane, and the upper pairs and lower pairs of rollers of one side of the carriages being adapted to ride at one time upon the vertical guideways when the carriages are traveling in a vertical plane, the vertical guideways having bifurcated ends turned inwardly in the direction of and in the line of travel of all the pairs of rollers, said bifurcated ends being adapted to transfer the carriages from their horizontal to their vertical travel without in any way tilting the carriages.

2. Apparatus as in claim 1 wherein both the horizontal and vertical guideways are U-shaped and wherein the ends of the vertical guideways are furcated and turned inwardly and lie in the line of travel of all of the rollers of the carriages and being adapted to change the plane of travel of the carriages from horizontal to vertical without tilting them.

CHARLES G. HALL.